United States Patent [19]
Ito et al.

[11] Patent Number: 5,317,122
[45] Date of Patent: May 31, 1994

[54] DISCHARGE-PROCESSING ELECTRIC POWER-SOURCE ASSEMBLY

[75] Inventors: Akiyasu Ito; Munenori Kimura; Kazuo Tsurumoto; Shouichi Nagasaka, all of Nagoya, Japan

[73] Assignee: Mitsubishi Denki Kabushiki Kaisha, Tokyo, Japan

[21] Appl. No.: 8,989

[22] Filed: Jan. 26, 1993

[30] Foreign Application Priority Data

Jan. 28, 1992 [JP] Japan .................................. 4-012907

[51] Int. Cl.⁵ .............................................. B23H 1/02
[52] U.S. Cl. .................................................. 219/69.18
[58] Field of Search ........................ 219/69.13, 69.18

[56] References Cited

FOREIGN PATENT DOCUMENTS

| | | |
|---|---|---|
| 412262 | 2/1991 | European Pat. Off. ......... 219/69.18 |
| 63-221919 | 9/1988 | Japan . |
| 2-71920 | 3/1990 | Japan . |
| 3-55117 | 3/1991 | Japan ................. 219/69.18 |

*Primary Examiner*—Geoffrey S. Evans
*Attorney, Agent, or Firm*—Sughrue, Mion, Zinn, Macpeak & Seas

[57] ABSTRACT

A discharge-processing power-source assembly, in which a processing liquid is interposed at a minute gap defined between a workpiece and an electrode, and processing is executed by discharge energy, comprises a D.C. power source supplying electric energy to the minute gap, switching elements for converting D.C. voltage from the D.C. power source to pulse voltage, and a snubber circuit for protecting the switching elements. The discharge-processing power-source assembly further comprises a relay contact for cutting off the snubber circuit when a switching frequency is high.

7 Claims, 13 Drawing Sheets

DISCHARGE-PROCESSING ELECTRIC POWER-SOURCE ASSEMBLY

FIELD OF THE INVENTION

The present invention relates to discharge-processing power-source assemblies in which a processing liquid is interposed at a minute gap defined between a workpiece and an electrode, and processing is executed by discharge energy and, more particularly, to a discharge-processing power-source assembly in which concentrated discharge is reduced in a discharge processing machine, to improve surface roughness and to prevent a wire from being cut. Further, the present invention relates to a discharge-processing power-source assembly in which, when electric energy inputted between poles in a wire discharge processing machine increases, the wire is prevented from being cut. Furthermore, the present invention relates to a protective function for the discharge-processing power-source assembly.

BACKGROUND OF THE INVENTION

Figure 8:
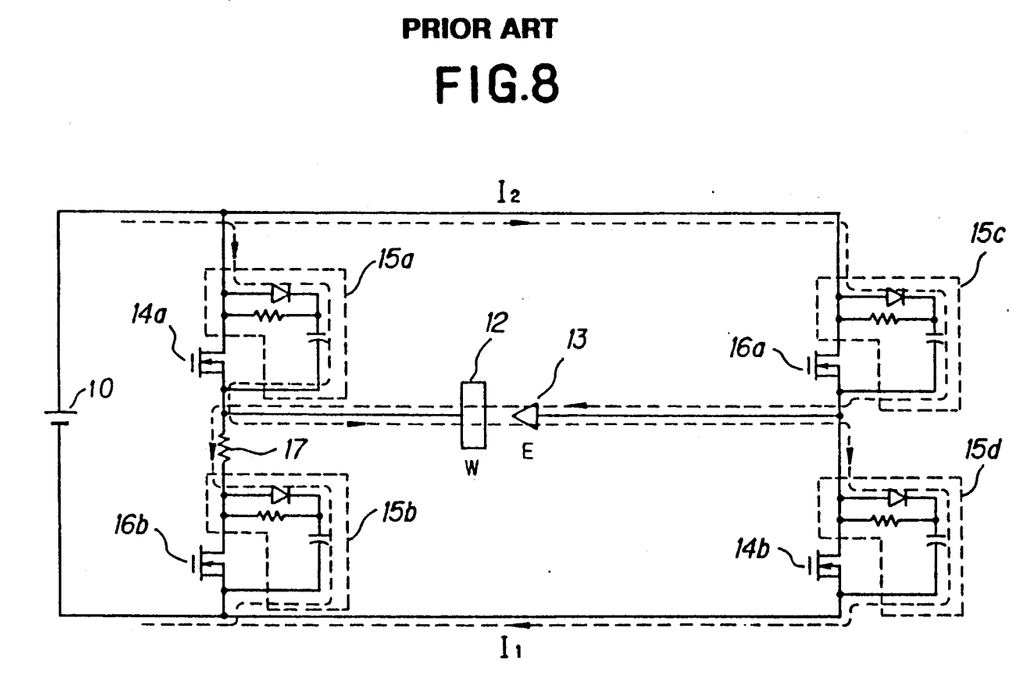
FIG. 8 is a circuit view showing an arrangement of a conventional discharge-processing power-source assembly.

FIG. 8 of the attached drawings is a circuit view of, for example, a conventional discharge-processing power-source assembly. In FIG. 8, the reference numeral 10 denotes a D.C. power source; 12, a workpiece; 13, an electrode; and 14a, 14b, a first pair of switching elements which, here, are power MOS-FETs; 16a and 16b, a second pair of switching elements which, here, are power MOS-FETs; 15a, 15b, 15c, 15d, snubber circuits for protecting the power MOS-FETs 14a and 14b, and 16a and 16b, each of which is composed of a diode, a capacitor, and a resistance. The reference numeral 17 denotes a discharge preventing resistance.

Operation will next be described. D.C. voltage is applied to a location between the processing electrode 13 and the workpiece 12 (hereinafter referred to as "an interpole location") by the D.C. power source 10, and the first pair of switching elements 14a and 14b are turned ON/OFF simultaneously for a predetermined period of time, to generate a group of pulses of positive voltage, thereby executing discharge processing. Subsequently, the second pair of switching elements 16a and 16b are turned ON/OFF simultaneously for a predetermined period of time, to generate a group of pulses of reverse voltage. However, in order to make it difficult to generate discharge, the discharge preventing resistance 17 is inserted as shown in FIG. 8. This series of operations is executed repeatedly so that discharge processing proceeds.

Figure 9A:
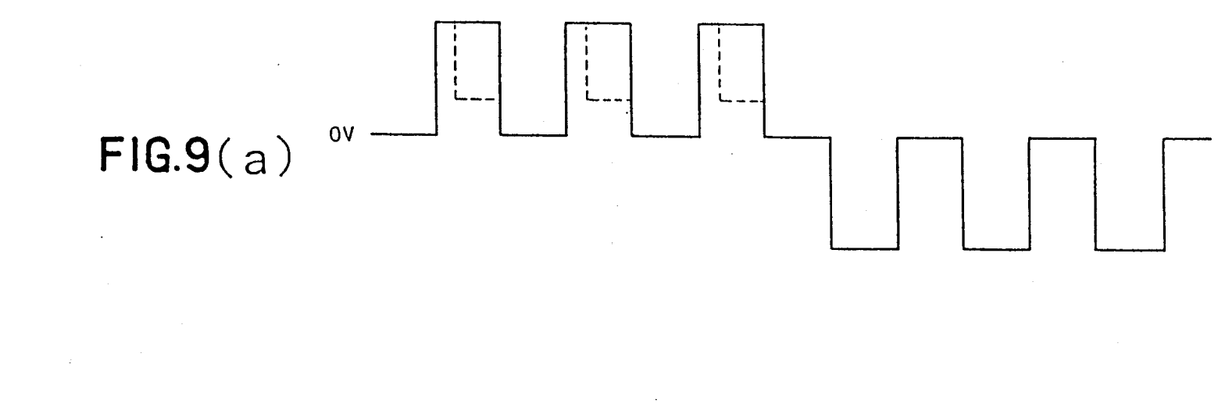
FIGS. 9(a) and 9(b) are views showing a waveform of interpole discharge voltage of the conventional discharge-processing power-source assembly.
Figure 9B:
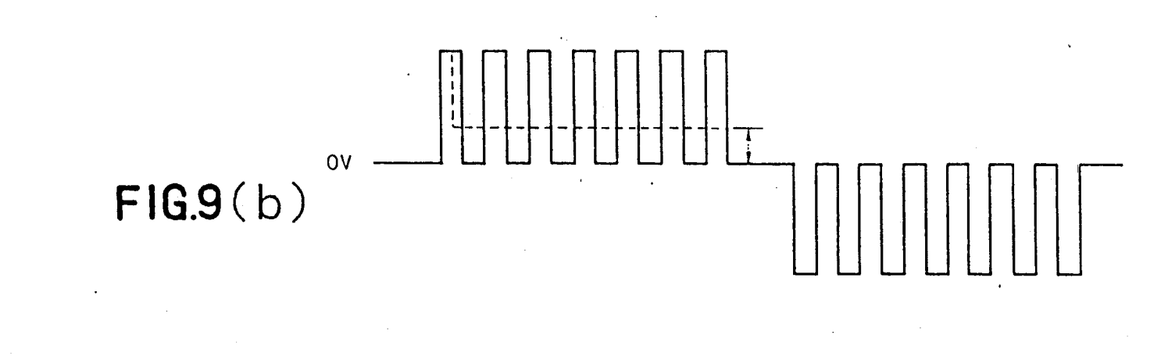

A waveform of the interpole discharge voltage will next be described with reference to FIGS. 9(a) and 9(b). FIG. 9(a) shows a waveform of the interpole discharge voltage at the time a switching frequency is low (equal to or less than several tens (10) KHz). However, discharge is surely or certainly executed one by one. When the switching elements are turned OFF, the interpole voltage is brought to 0 V. On the other hand, the waveform of the interpole discharge voltage at the time the switching frequency is high (equal to or more than several hundreds (100) KHz) is illustrated in FIG. 9(b). However, once discharge occurs, even if the switching elements are turned OFF, an impedance of the snubber circuits is lowered because the frequency is high, so that processing current does not pass through the switching elements, but continues to flow through the diodes and capacitors of the snubber circuits, as seen for $I_1$ (on the side of positive voltage) and $I_2$ (on the side of reverse voltage) illustrated in FIG. 8). Thus, the processing current is brought to concentrated discharge, and the waveform of the interpole discharge voltage is not brought to 0 V even if the switching elements are turned OFF, but is brought to arc voltage.

Figure 10:
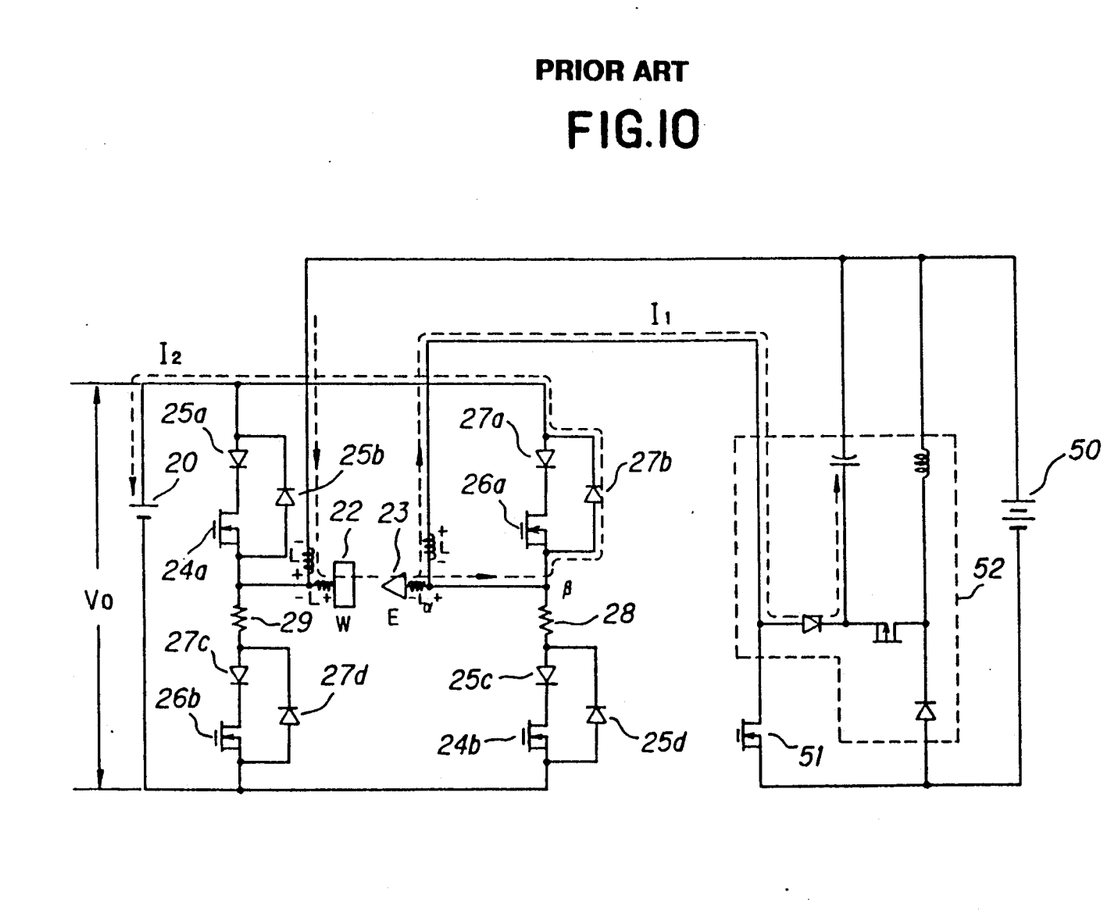
FIG. 10 is a circuit view showing an arrangement of a conventional wire discharge-processing power-source assembly.

Further, FIG. 10 is a circuit view of another conventional discharge-processing power-source assembly. In FIG. 10, the reference numeral 20 denotes a first D.C. power source; 22, a workpiece; 23, a wire electrode; 24a, 24b, a first pair of switching elements which, here, are power MOS-FETs; 25a, 25b, 25c, 25d, diodes for protecting the power MOS-FETs; 26a, 26b, a second pair of switching elements which, here, are power MOS-FETs; 27a, 27b, 27c, 27d, diodes for protecting the power MOS-FETs; 28, a current limiting resistance for positive voltage; 29, a current limiting resistance for reverse voltage; 50, a second D.C. power source; 51, a third switching element which, here, is a power MOS-FET; and 52, a surge absorbing circuit.

Operation will next be described. D.C. voltage is applied to the interpole location between the processing electrode 23 and the workpiece 22 by the first D.C. power source 20, and the first pair of switching elements 24a and 24b are simultaneously turned ON, to generate discharge through the current limiting resistance 28 for positive voltage. Immediately thereafter, the third switching element 51 is turned ON so that processing current contributing to processing treatment flows between poles due to the second D.C. power source 50. After a predetermined on-time has been completed, the first pair of switching elements 24a and 24b and the third switching element 51 are turned OFF. Subsequently, the second pair of switching elements 26a and 26b are simultaneously turned ON, to apply reverse voltage to the interpole location through the current limiting resistance 29 for reverse voltage. This series of operations is executed repeatedly so that discharge-processing treatment proceeds. The operation waveform is illustrated in FIG. 11.

Figure 11:
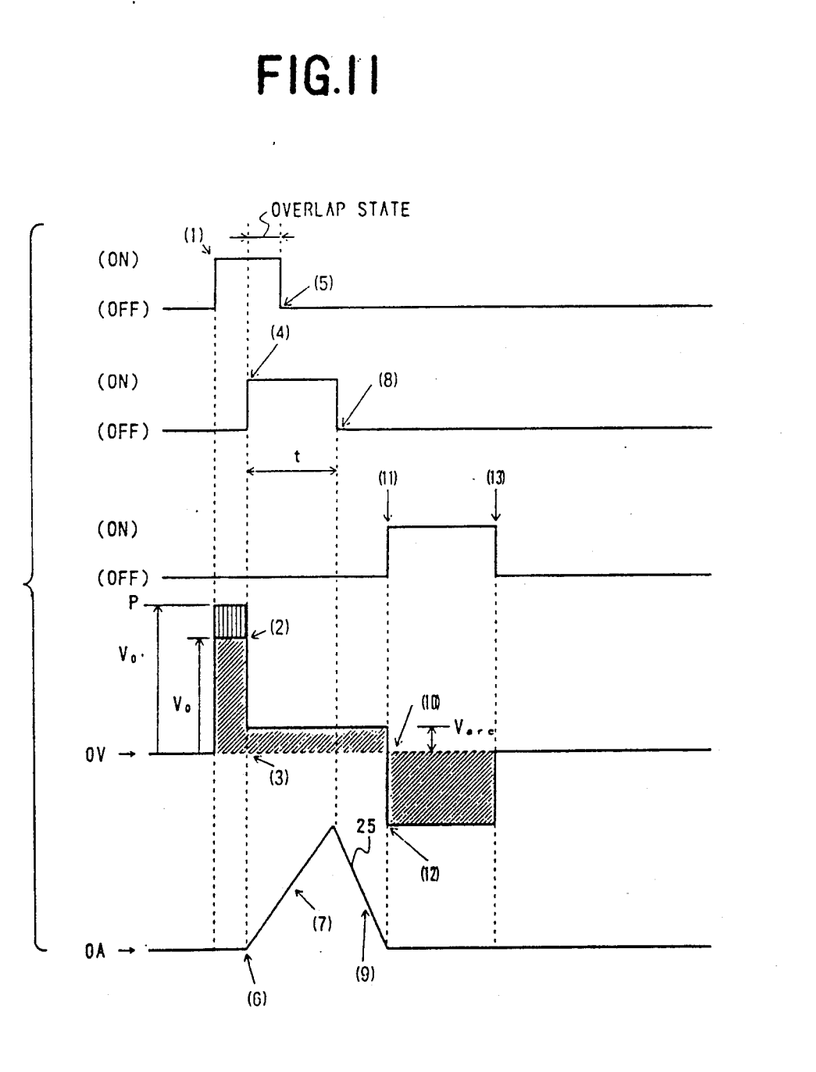
FIG. 11 is a view showing operation waveforms of the conventional wire discharge-processing power-source assembly.

In FIG. 11, the first pair of switching elements 24a and 24b are set to ON state, as illustrated at waveform A step (1). At this point, the second and third switching elements 26a, 26b and 51 are in OFF state. Next, voltage ($V_0$) is applied to the interpole location from the first D.C. power source 20, as seen in waveform D of FIG. 11 at step (2). If a dielectric breakdown occurs at the interpole location, the voltage is dropped from voltage $V_0$ to an arcing voltage, as seen in waveform D at step (3).

After a dielectric breakdown has occurred, the third switching element 51 is set to an ON state at once, as seen at step (4) of waveform B, for a fixed time t. Meanwhile, the first pair of switching elements 24a and 24b remain in an ON state (overlap state) at the same time, as seen in waveform A. Thereafter, the first pair of switching elements 24a and 24b are set to an OFF state, as seen in waveform A at step (5). It should be noted that after the third switching element 51 is set to ON state at step (4), and processing current is applied to the interpole location from the second D.C. power source 50, as seen in waveform E.

The slope of the processing current at step (7) of waveform E is decided by the inductance (L) of the feeder connected to the interpole location from the second D.C. power source 50. This relationship is represented by the following expression:

$$I = \frac{V}{L} t$$

I: processing current
V: second D.C. power source voltage
L: inductance of feeder
t: On time of third switching element After desired ON time (t) is passed, the third switching element 51 is set to an OFF state, as seen in waveform B at step (8). Thereafter, the processing current does not change to zero at once, even through the third switching element 51 is set to an OFF state, and the processing current continue to flow until an energy stored in inductance of the feeder changes to zero. This current route is shown by $I_1$ and $I_2$ in FIG. 10 and is illustrated in waveform E at step (9).

When the processing current (waveform E) and arcing voltage (waveform D) at the interpole location are changed to zero (step 10), the second pair of switching elements 26a and 26b are set to an ON state at once, as seen at step (11) of waveform C. As a result, reversed polarity voltage is applied to the interpole location from the first D.C. power source 20 and waveform D falls to step (12). After fixed time is passed, the second pair of switching elements 26a and 26b are set to the OFF state, and the voltage value at the interpole location is changed to zero, as seen at step (13).

The above steps (1)–(13) comprise one cycle for one processing. While the processing is being executed for one cycle, when the third switching element 51 is set to the OFF state, as seen in step (8) of waveform B, the current ($I_2$) continues to flow to the first D.C. power source 20, as seen at step (9) of waveform E. Since a capacitor (not shown) is connected to the first D.C. power source 20, the current continues to flow to the capacitor. Accordingly, an output voltage of the first D.C. power source 20 rises from $V_0$ to $V_0'$, as seen in waveform D, and breakage of the wire occurs.

Figure 12:
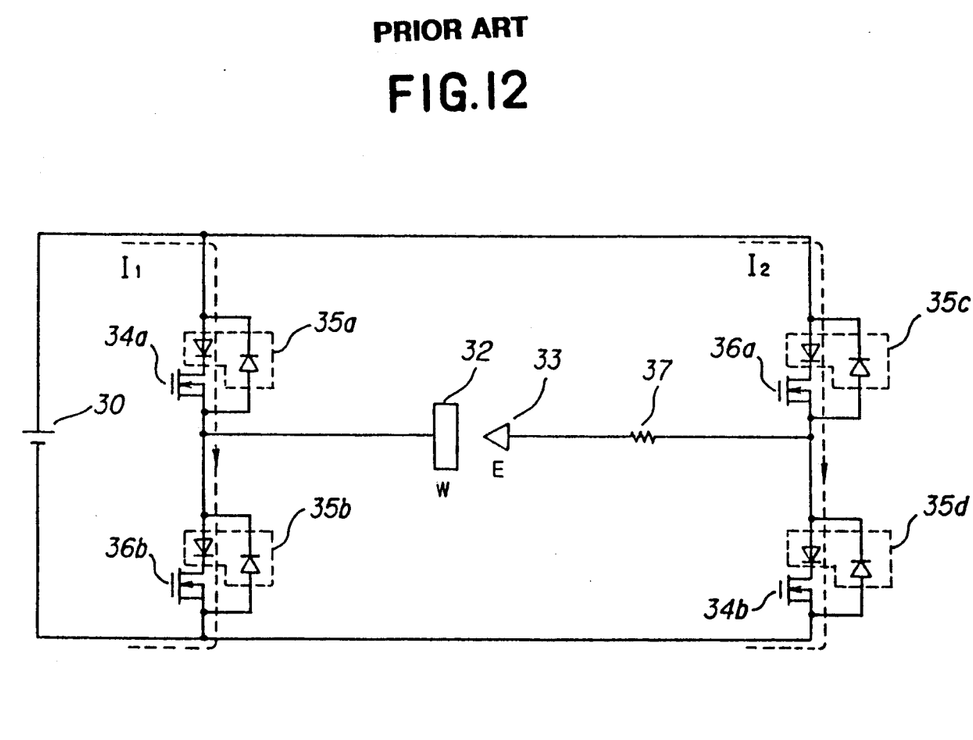
FIG. 12 is a circuit view showing an arrangement of a conventional discharge-processing power-source assembly.

FIG. 12 is a circuit view of another conventional discharge-processing power-source assembly. In FIG. 12, the reference numeral 30 denotes a D.C. power source; 32, a workpiece; 33, an electrode; 34a, 34b, a first pair of switching elements which, here, are power MOS-FETs; 36a, 36b, a second pair of switching elements which, here, are power MOS-FETs; 35a, 35b, 35c and 35d, diodes for protecting the power MOS-FETs; and 37, a current limiting resistance.

Operation will next be described. D.C. voltage is applied to the interpole location between the processing electrode 33 and the workpiece 32, and the first pair of switching elements 34a and 34b are simultaneously turned ON/OFF for a predetermined period of time, to generate a pulse of positive voltage for executing discharge processing. Subsequently, the second pair of switching elements 36a and 36b are simultaneously turned ON/OFF for a predetermined period of time, to generate a pulse of reverse voltage. The current limiting resistance 37 is inserted in order to obtain a desired discharge current. This series of operations is repeatedly executed so that discharge processing treatment proceeds.

Figure 13:
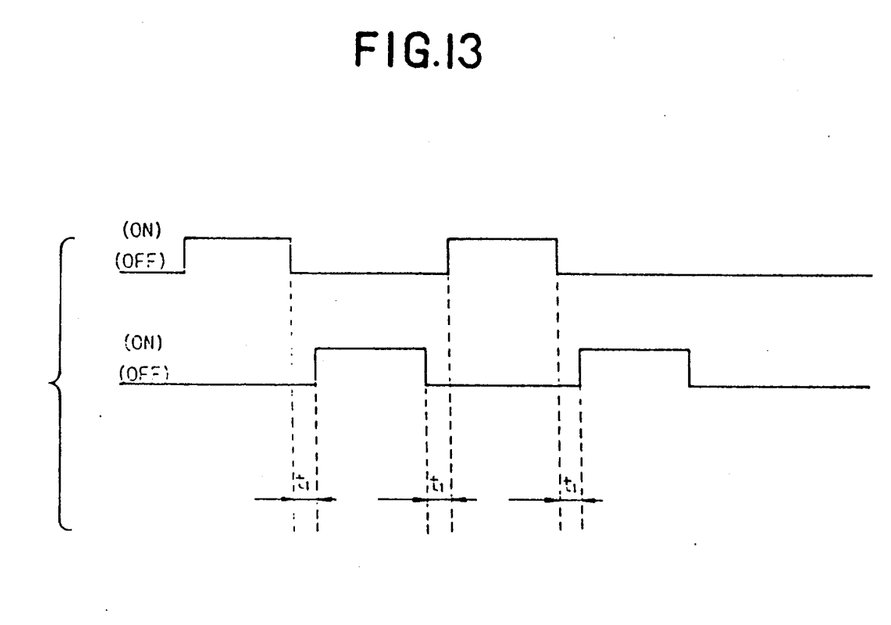
FIG. 13 is a view showing operation waveforms indicating dead time, of a circuit of the conventional discharge-processing power-source assembly in FIG. 12.

Here, in order that upper and lower switching elements in a first arm (a portion comprising an upper side of the first pair of switching elements and a lower side of the second pair of switching elements together) or a second arm (a portion comprising a lower side of the first pair of switching elements and an upper side of the second pair of switching elements together) do not cause short-circuiting, it is necessary that both the first-/second pairs of switching elements are brought to an OFF condition (dead time) when there is switching between a positive voltage and a reverse voltage (t1 period illustrated in FIG. 13). The dead time prevents two pulses from overlapping and causing a short circuit.

Ordinarily, high processing speed is desired and the discharge frequency must be raised in order to increase the processing speed. For this purpose, it is required that the dead time is shortened and brought close to 0. However, even if the dead time is shortened so as to be located in the neighborhood of 0, the dead time may be insufficient to prevent a short circuit of these are completely runs out by variations in the electronic circuit parts for generating the dead time, variations in the characteristic of the electronic parts attendant upon variation in disturbance due to a temperature and the like, and further by malfunction due to noises or the like. Thus, upper and lower or vertical short-circuiting may be caused by the operation of the concurrent first-/second arms.

As reference technical literatures relating the patent invention, there are "ELECTRIC POWER-SOUSE ASSEMBLY FOR DISCHARGE-PROCESSING DEVICE" disclosed in Japanese Patent Laid-Open No.SHO 63-221919, and "ELECTRIC POWER-SOUSE ASSEMBLY FOR DISCHARGE-PROCESSING" disclosed in Japanese Patent Laid-Open No.HEI 2-71920.

The conventional discharge-processing power-source assembly has been constructed as described above. Accordingly, once discharge occurs, discharge current continues to flow through the snubber circuits, even if the switching elements are turned OFF (this particularly noticeably appears if the switching frequency is high). Thus, there is a problem that concentrated discharge occurs so that a processed surface is roughened, or breakage of a wire occurs.

Further, for the conventional discharge-processing power-source assembly that has been constructed as described above, the surge current flowing at the time the third switching element is turned OFF is regenerated also at the first D.C. power source ($I_2$ illustrated in FIG. 10), in addition to the surge absorbing circuit ($I_1$ illustrated in FIG. 10). Open voltage $V_0$ at the time discharge is first generated rises. Thus, there is a problem that breakage of the wire occurs.

Furthermore, for the conventional discharge-processing power-source assembly that has been constructed for high speed processing as described above, the dead time completely runs out, and there is a case where vertical short-circuiting occurs at the first/second arms. When excessive current flows through the switching elements ($I_1$ and $I_2$ illustrated in FIG. 12), there is a problem that the switching elements are destroyed so that processing treatment is disabled.

SUMMARY OF THE INVENTION

The invention solves the above problems. Specifically, it is a first object of the invention to provide a discharge-processing power-source assembly in which, even if a switching frequency is high, there is no case where discharge current continues to flow at the time switching elements are turned OFF, concentrated discharge is difficult to occur, and a processed surface can not be roughened so that a wire is prevented from being cut.

Further, it is a second object of the invention to provide a discharge-processing power-source assembly, in which surge current is not regenerated at a first D.C. power source, and desired open voltage $V_0$ is maintained, whereby it is possible to prevent a wire from being cut.

Furthermore, it is a third object of the invention to provide a discharge-processing power-source assembly in which, even if there is a condition in which a command is inputted such that vertical short-circuiting occurs, excessive current does not flow through the switching elements. Breakage of the switching elements is avoided.

Moreover, it is a fourth object of the invention to provide a discharge-processing power-source assembly, in which excessive surge voltage is not applied to first-/second switching elements so as to cause breakage of the switching elements.

The discharge-processing power-source assembly according to the invention is arranged such that, when the switching frequency is high, the snubber circuit is cut off so that concentrated discharge is not generated.

Further, the wire discharge-processing power-source assembly according to the invention is arranged such that the surge current is not regenerated at the first D.C. power source, and desired open voltage $V_0$ is maintained.

Furthermore, the discharge-processing power-source assembly according to the invention is arranged such that, even if there is a condition under which vertical short-circuiting is generated as a result of an inputted command, excessive current does not flow through the switching elements.

Moreover, the discharge-processing power-source assembly according to the invention is arranged such that surge current flows smoothly so that excessive surge voltage is not applied to switching elements.

As described above, according to the invention, even when the switching frequency is high, the discharge current does not continue to flow. Accordingly, the concentrated discharge does not occur. Thus, the processed surface is not roughened, and the wire will not break, and stable processing treatment can be executed. Further, since the invention is a circuit construction or arrangement in which the relay contact for cutting off the snubber circuit is added to the conventional discharge-processing power-source assembly, there are also produced advantages that the construction is simple and low in cost.

Further, according to the invention, since the surge current is not regenerated at the first D.C. power source and the open voltage is maintained at a desired value, even if electric energy inputted between the poles increases, the wire is difficult to be cut so that processing is executed stably. Furthermore, since the circuit construction or arrangement is substantially the same as that of the conventional discharge-processing power-source assembly, there can also be produced advantages that the circuit arrangement is simple and low in cost.

Moreover, according to the invention, the noise and the dead time for increasing the processing speed are brought to 0 (ideal condition). Even if the vertical short-circuiting between the first/second arms occurs, excessive current does not flow through the switching elements. Accordingly, the discharge-processing power-source assembly is not broken or destroyed so that processing can be stably executed at a higher speed. Further, since the invention is substantially the same in circuit construction or arrangement as that of the conventional power-source assembly, there can also be produced advantages that the arrangement is simple and low in cost.

Furthermore, according to the invention, since the surge current flows so as to bypass the current limiting resistances for positive voltage/reverse voltage, excessive voltage is not applied to $V_{DS}$ of the switching elements, and the discharge-processing power-source assembly is not destroyed. Thus, processing treatment can be executed at a high speed and stably. Moreover, since only the connection of components is altered or modified in the same circuit arrangement as that of the conventional discharge-processing power-source assembly, there can also be produced advantages that the circuit arrangement is simple and low in cost.

Other objects and features of this invention will become understood from the following description with reference to the accompanying drawings.

DESCRIPTION OF THE EMBODIMENTS

Figure 1:
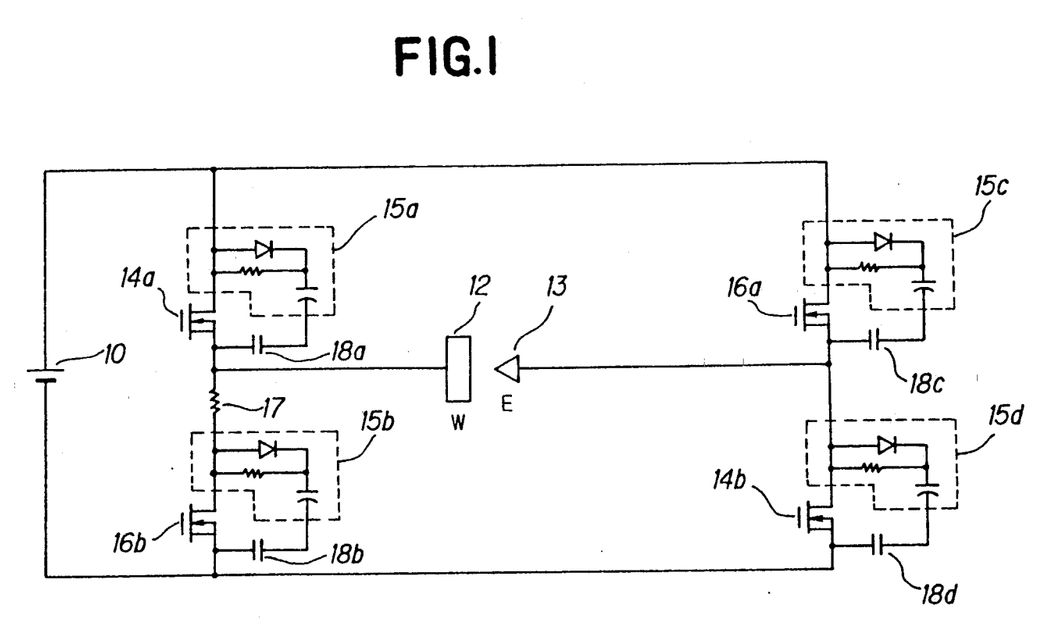
FIG. 1 is a circuit view showing an arrangement of a discharge-processing power-source assembly according to the invention.

Various embodiments of the invention will hereunder be described with reference to the drawings. In FIG. 1, the reference numerals 10~17 are entirely identical in construction or arrangement with those of the conventional discharge-processing power-source assembly. In FIG. 1, the reference numerals 18a, 18b, 18c, 18d denote cut-off means for respective snubber circuits. In this embodiment, mechanical relay contacts are used for the cut-off means, but semiconductor switches also can be used.

Operation will next be described. A pulse waveform regarding processing treatment is the same as that of the conventional power-source assembly. Description will be made centering around the prevention of a concentrated discharge. On the basis of set processing conditions, ON/OFF signals are outputted to the first and second switching elements 14a and 14b, and 16a and 16b by an oscillator (not shown) so that switching operation is executed. Here, protection of the switching elements 14a and 14b, and 16a and 16b is executed while relay contacts 18a, 18b, 18c and 18d for cutting off the snubber circuits 15a, 15b, 15c and 15d are closed, when a switching frequency is low (equal to or less than several tens (10) KHz).

Next, when a processing condition is set in which a switching frequency is high (equal to or more than several hundreds (100) KHz), the relay contacts 18a, 18b, 18c and 18d for cutting off the snubber circuits 15a, 15b, 15c and 15d are opened so that discharge current does not continue to flow through the snubber circuits 15a, 15b, 15c and 15d.

Figure 2:
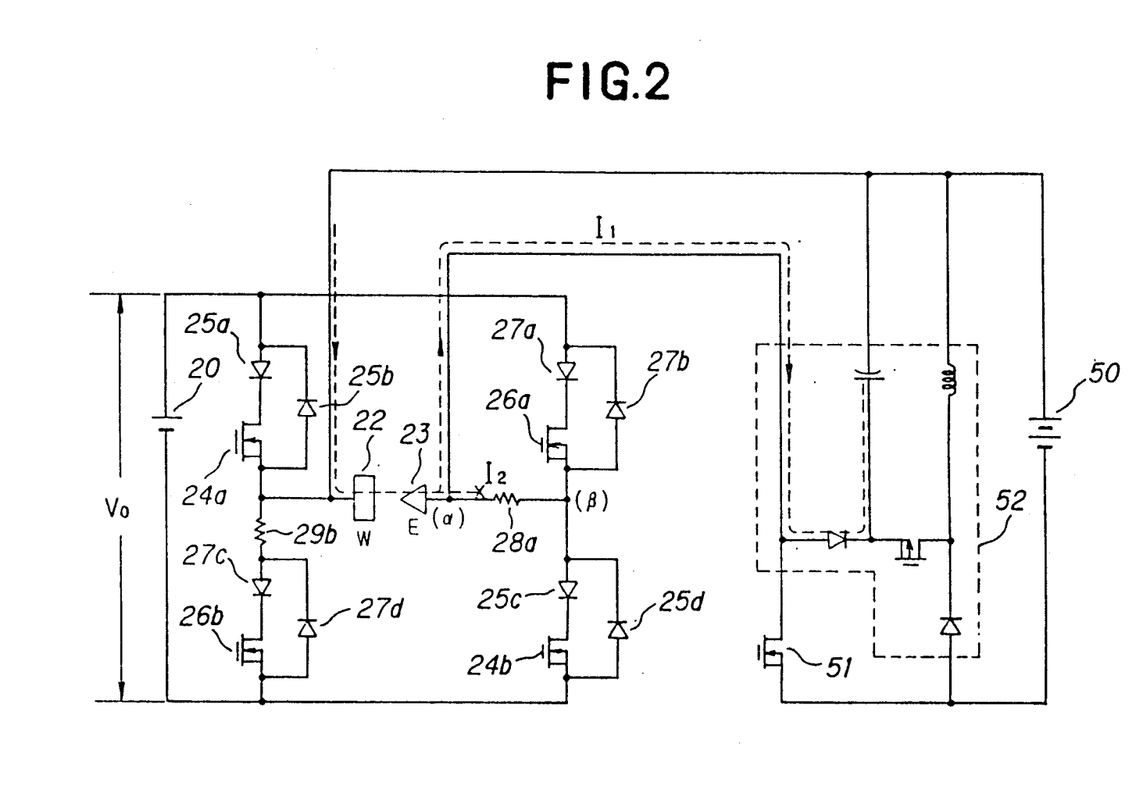
FIG. 2 is a circuit view showing an arrangement of a discharge-processing power-source assembly according to the invention.

Another embodiment of the invention will be described with reference to the drawings. In FIG. 2, elements other than current limiting resistances 28a and 29b for the positive voltage/reverse voltage are entirely the same as those of the conventional discharge-processing power-source assembly. The reference numeral 28a denotes the current limiting resistance for positive and reverse voltage. A value of the current limiting resistance 28a is the same as that of the conventional discharge-processing power-source assembly. However, the current limiting resistance 28a is different in position inserted from that of the conventional discharge-processing power-source assembly. That is, the current limiting resistance 28a is inserted between a point of intersection ($\alpha$) between the electrode and the third switching element and a point of intersection ($\beta$) between a lower side of the first pair of switching elements and an upper side of the second pair of switching elements. The reference numeral 29b denotes the current limiting resistance for reverse voltage. A position at which the current limiting resistance 29b is inserted is the same as that of the conventional discharge-processing power-source assembly. However, the current limiting resistance 29b is different in value from that of the conventional discharge-processing power-source assembly, and the value is brought to a value in which the value of the current limiting resistance for positive voltage is subtracted from the value of the conventional current limiting resistance for reverse voltage.

The above rules are shown by the following expressions:

(1) The value of the current limiting resistance 28 for positive voltage shown in FIG. 10 is equal to the value of the current limiting resistance 28a for positive and reverse voltage shown in FIG. 2

(2) The value of the current limiting resistance 29 for reverse voltage shown in FIG. 10 is equal to
  (a) the value of the current limiting resistance 29b for reverse voltage shown in FIG. 2, plus
  (b) the value of the current limiting resistance 28a for positive and the reverse voltage resistance shown in FIG. 2

Figure 3:
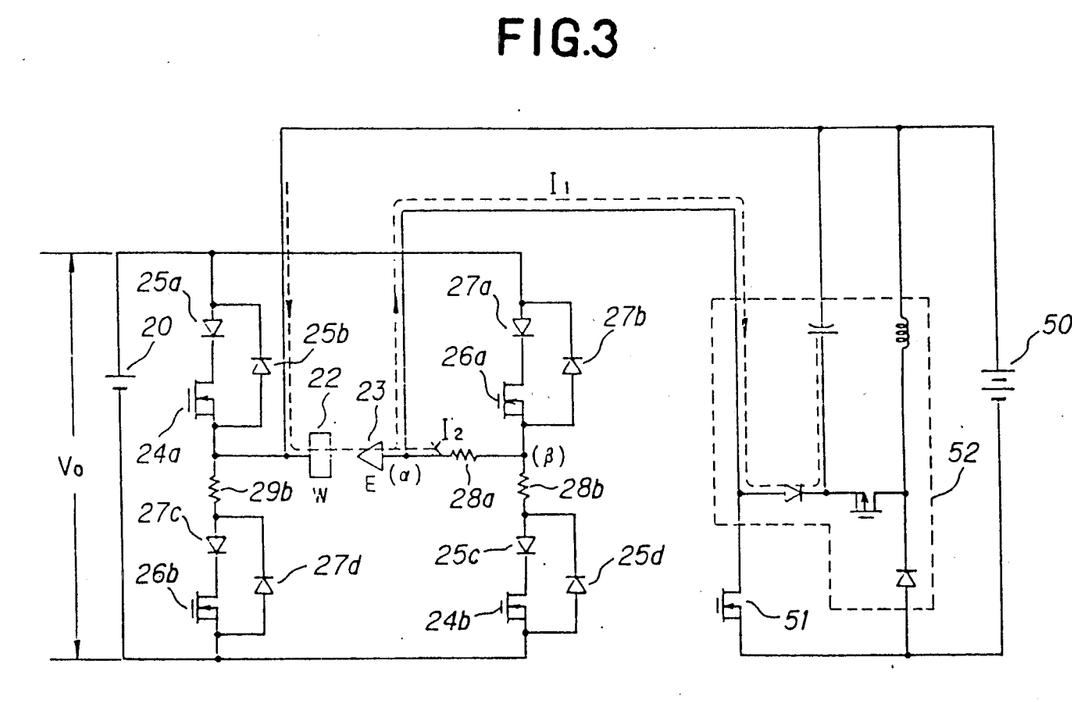
FIG. 3 is a circuit view showing an other arrangement of a discharge-processing power-source assembly according to the invention.

And it is possible to set the current limiting resistance 28b for positive voltage to the circuit shown in FIG. 2 as shown in FIG. 3. The rules are shown by the following expressions:

(3) The value of the current limiting resistance 28 for positive voltage shown in FIG. 10 is equal to
  (a) the value of the current limiting resistance 28a for positive and reverse voltage shown in FIG. 3 plus
  (b) the value of the current limiting resistance 28b for the positive voltage shown in FIG. 3.

The value of the current limiting resistance 29 for reverse voltage shown in FIG. 10 is equal to
  (a) the value of the current limiting resistance 28b for positive and reverse voltage shown in FIG. 3 plus
  (b) the value of the current limiting resistance 29b for the reverse voltage shown in FIG. 3.

Operation will next be described. A pulse waveform regarding processing treatment is the same as that of the conventional discharge-processing power-source assembly. Here, surge current will be described. First, when the third switching element 51 is turned OFF, the surge current flows into the surge absorbing circuit 52 ($I_1$). Further, the surge current tends to be regenerated at the first D.C. power source 20 ($I_2$). However, the surge current is prevented from flowing by the current resistance 28a for positive voltage. Thus, voltage is maintained at a desired value.

Figure 4:
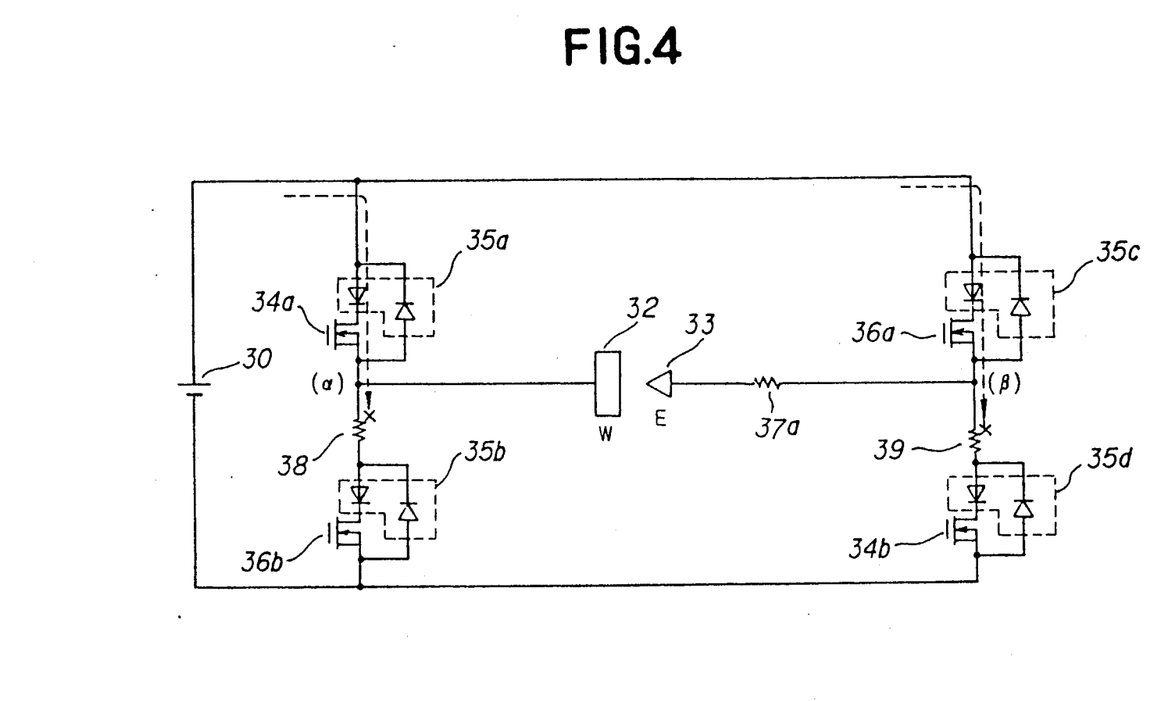
FIG. 4 is a circuit view showing an arrangement of a discharge-processing power-source assembly according to the invention.

Another embodiment of the invention will be described with reference to the drawings. In FIG. 4, the another embodiment is entirely the same in construction or arrangement as the conventional discharge-processing power-source assembly, except for current limiting resistances 38 and 39 for positive voltage/reverse voltage. The current limiting resistances 38 and 39 for positive voltage/reverse voltage are the same in function as those of the conventional discharge-processing power-source assembly, but are independent in view of an arrangement of a circuit construction.

Next, operation will be described. A pulse waveform regarding processing is the same in construction as that of the conventional discharge-processing power-source assembly. Here, description will be made centering around vertical short-circuiting of first/second arms. Even if vertical short-circuiting occurs due to some cause, i.e., when the dead time is shortened so as to be located very close to 0, there will be no problems if the following are ingalemented. First, the current limiting resistance 38 for reverse voltage is inserted between (i) a point of intersection ($\alpha$) between the first arm, comprising side 34a of the first pair of switching elements and a lower side 36b of the second pair of switching elements, and a workpiece 32, and (ii) the lower side 36b of the second pair of switching elements. Second, the current limiting resistance 39 for positive voltage is inserted between (i) a point of intersection ($\beta$) between the second arm, comprising lower side 34b of the first pair of switching elements and an upper side 36a of the second pair of switching elements, and the poles, and (ii) the lower side 34b of the first pair of switching elements. Accordingly, excessive current does not flow (a value of the current limiting resistance is beforehand so designed as to become a value equal to or smaller than a rated current value), and destruction of the switching elements is prevented.

Figure 5:
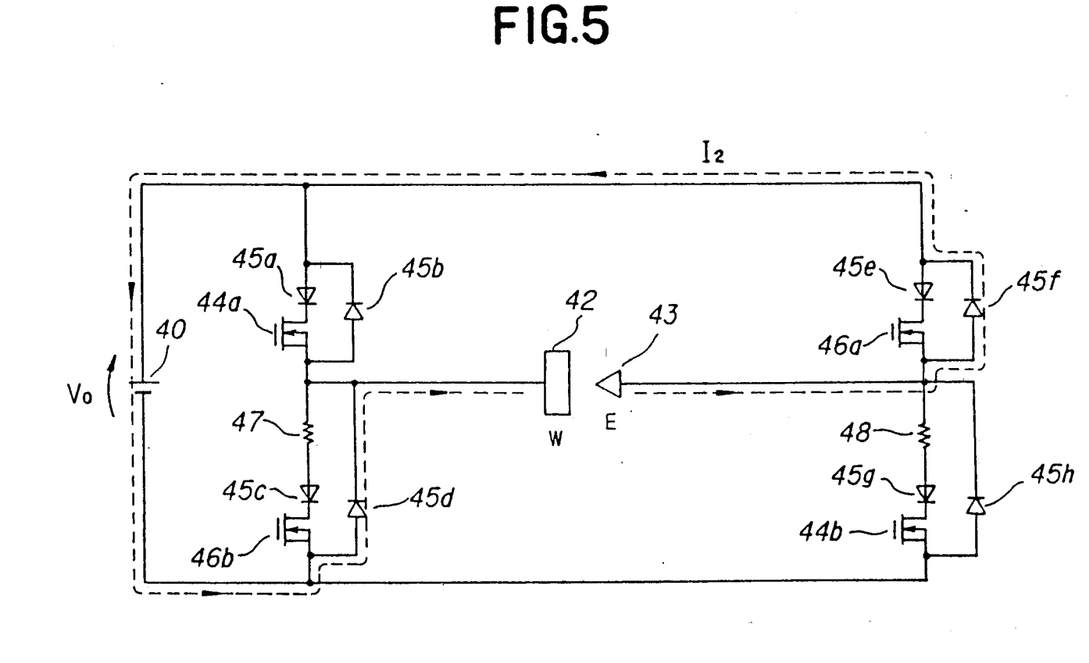
FIG. 5 is a circuit view showing an arrangement of a discharge-processing power-source assembly according to the invention.

Another embodiment of the invention will be described with reference to the drawings. In FIG. 5, a power-source construction or arrangement is the same as that of the conventional discharge-processing power-source assembly. However, connection of the diodes serving as a protection for the switching elements is different from that of the conventional discharge-processing power-source assembly. That is, a cathode of a diode 45h which is connected in parallel to a lower side 44b of the first pair of switching elements is connected to an electrode 43, while a cathode of a diode 45d connected in parallel to a lower side 46b of the second pair of switching elements is connected to a workpiece 42.

Operation will next be described. A pulse waveform regarding processing is the same as that of the conventional discharge-processing power-source assembly. Here, description will be made to the fact that excessive surge voltage is not applied to $V_{DS}$ of the first/second pairs of switching elements 44a and 44b, 46a and 46b. A path of surge current ($I_2$) at the time the first pair of switching elements 44a and 44b shift from "ON" to "OFF" is illustrated in FIG. 4.

The path is such that, since a limiting resistance 47 for reverse voltage is bypassed by a protection diode 45d of the switching element 46b, the surge current flows smoothly so that excessive surge voltage is not applied to $V_{DS}$ of the first pair of switching elements 44a and 44b.

Similarly, also when the second pair of switching elements 46a and 46b shift from "ON" to "OFF", excessive surge voltage is not applied to $V_{DS}$ of the second pair of switching elements 46a and 46b, because the surge current bypasses a limiting resistance 48 for positive voltage by the protection diode 45h.

Figure 6:
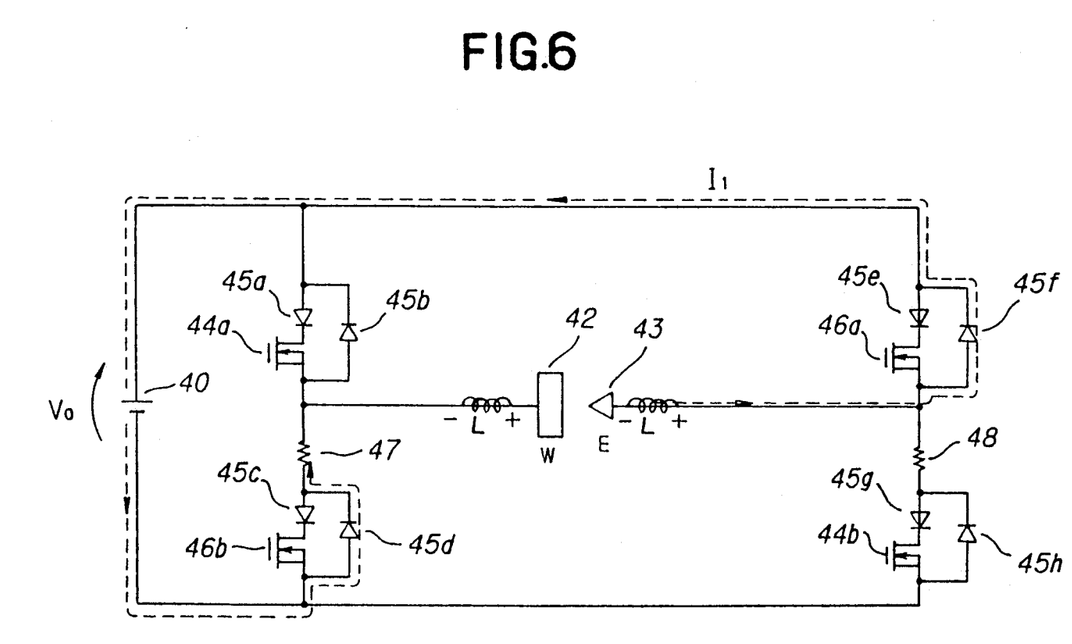
FIG. 6 is a circuit view showing an arrangement of a discharge-processing power-source assembly according to the invention.

Moreover, FIG. 6 is a circuit view showing an arrangement of another discharge-processing power-source assembly according to the invention. In FIG. 6, the reference numeral 40 denotes a D.C. power source; 42, a workpiece; 43, an electrode; 44a, 44b, a first pair of switching elements which, here, are power MOSFETs; 46a, 46b, a second pair of switching elements which, here, are power MOS-FETs; 45a, 45b, 45c, 45d, 45e, 45f, 45g, 45h, diodes for protecting the power MOS-FETs; 47, a current limiting resistance for reverse voltage; and 48, a current limiting resistance for positive voltage.

Operation will next be described. D.C. voltage is applied to an interpole location between the processing electrode 43 and the workpiece 42 by the D.C. power source 40. The first pair of switching elements 44a and 44b are simultaneously turned ON/OFF for a predetermined period of time, to generate a pulse of positive voltage for executing discharge processing. Subsequently, the second pair of switching elements 46a and 46b are simultaneously turned ON/OFF for a predetermined period of time, to generate a pulse of reverse voltage. In order to obtain a desired discharge current, the current limiting resistances 47 and 48 for positive voltage/reverse voltage are inserted. This series of operations is repeatedly executed so that discharge processing treatment proceeds.

Here, a path of surge current ($I_1$) at the time the first pair of switching elements 44a and 44b shift from "ON" to "OFF" is illustrated in FIG. 6. The current limiting resistance 47 for reverse voltage is connected to the path of the surge current ($I_1$), and the surge current is not efficiently passed. ON/OFF signals from an oscillator (not shown) at this time, an interpole voltage/current waveform and a $V_{DC}$ waveform of the first pair of switching elements 44a and 44b are illustrated in FIG. 7.

As the moment the first pair of switching elements 44a and 44b shift from "ON" to "OFF", the surge current ($I_1$) is not efficiently passed by the current limiting resistance 47 for reverse voltage and, therefore, there is a case where excessive surge voltage is generated at $V_{DS}$ (voltage between drain and source) of the first pair of switching elements 44a and 44b so that the rating of the switching elements is exceeded. A similar phenomenon also occurs at a moment when the second pair of switching elements 46a and 46b shift from "ON" to "OFF".

Figure 7:
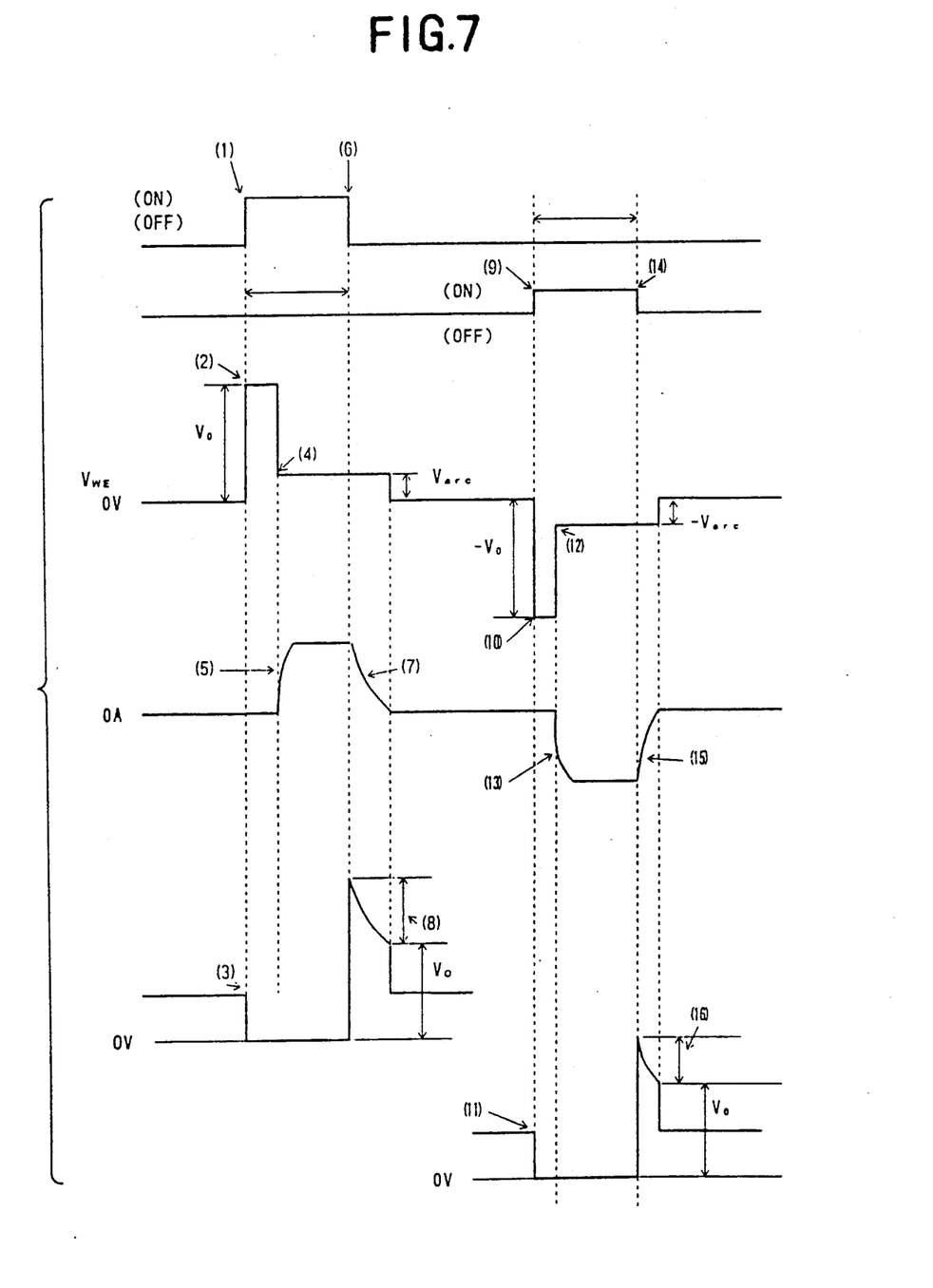
FIG. 7 is a view showing an operation waveform, a waveform of interpole voltage and current, a $V_{DS}$ waveform of switching elements of the discharge-processing power-source assembly circuit according to the invention.

In FIG. 7, waveform A, the first pair of switching elements 44a and 44b are set to the ON state at step (1). Next, as seen in waveform B at step (2), the voltage ($V_0$) is applied to the interpole location from the D.C. power source 40. Also, as seen in waveform E at step (3), the voltage ($V_{DS}$) of the first pair of switching elements is changed to 0 V at this time. Thereafter, dielectric breakdown occurs at the interpole location, and the voltage drops to arcing voltage $V_{arc}$, as seen in step (4) of waveform C, and the processing current flows to the interpole location at the same time, as seen in waveform D, step (5).

After desired time is passed, the first pair of switching elements 44a and 44b are set to the OFF state, shown in waveform B, step (6). Thereafter, the processing current continues to flow until an energy stored in inductance L (shown in FIG. 6) of the feeder is changed to zero, as seen in waveform D at step (7). The current route (Il) is shown in FIG. 6. The current flows in the current limiting resistance 47 for reverse voltage, so that the surge voltage in accordance with voltage drop occurs at the switching element 44a, seen in waveform e at step (8). Next, after a fixed OFF time has passed, the second pair of switching elements 46a and 46b are set to an ON state, shown in waveform B, step (9). Thereafter, reversed polarity voltage of the voltage ($V_0$) is applied to the interpole location from the D.C. power source 40, as seen in waveform C, step (10).

Operations (11)-(16) are the same as the operations (3)-(8) shown in FIG. 7. However, voltage applied to the interpole location and processing current are set to a converse condition of the condition when the first pair of switching elements 44a and 44b are set to ON state. And, the surge voltage occurs at the switching element 46a.

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

What is claimed is:

1. A discharge-processing electric power-source assembly in which a gap is defined between a workpiece and an electrode, and processing is executed by discharge energy, said discharge-processing electric power-source assembly comprising:

a D.C. power source for supplying electric energy to said gap;

a switching element, controllably operable at a plurality of switching frequencies for converting a D.C. voltage of said D.C. power source to a pulse voltage;

a snubber circuit for protecting said switching element; and cut-off means for cutting off said snubber in accordance with the switching frequency of said switching element.

2. An electric power-source assembly for a discharge processing machine in which a processing liquid is provided at a gap defined between a workpiece and an electrode, and processing is executed by discharge energy, said electric power-source assembly comprising:
- a first D.C. power source;
- a first pair of switching elements for applying a positive voltage to said gap, said pair defining an upper and lower side;
- a second pair of switching elements for applying a reverse voltage to said gap, said pair defining an upper and lower side;
- a first current limiting resistance for said reverse voltage and coupled to said second pair of elements;
- a second D.C. power source coupled to said workpiece;
- a third switching element coupled to said electrode; and
- a second current limiting resistance for positive/reverse voltage, inserted between a point of intersection (α) of said electrode and said third switching element, and a point of intersection (β) of said lower side of said first pair of switching elements and said upper side of said second pair of switching elements.

3. An electric power-source assembly for a discharge processing machine in which a processing liquid is interposed at a gap defined between a workpiece and an electrode, and processing is executed by discharge energy, said electric power-source assembly comprising:
- a D.C. power source;
- a first pair of switching elements for applying a positive voltage to said workpiece and said electrode, said first pair defining an upper and lower side;
- a second pair of switching elements for applying a reverse voltage to said workpiece and said electrode said second pair defining an upper and lower side;
- a first current limiting resistance for positive voltage/reverse voltage coupled to said electrode;
- a second current limiting resistance for reverse voltage, inserted between a point of intersection (α) between a first arm, comprising an upper side of said first pair of switching elements and a lower side of said second pair of switching elements, and said workpiece, and the lower side of said second pair of switching elements; and
- a third current limiting resistance for positive voltage, inserted between a point of intersection (β) between a second arm, comprising a lower side of said first pair of switching elements and an upper side of said second pair of switching elements, and said gap, and the lower side of said first pair of switching elements.

4. An electric power-source assembly for a discharge processing machine in which a processing liquid is interposed at a gap defined between a workpiece and an electrode, and processing is executed by discharge energy, said discharge-processing electric power-source assembly comprising:
- a D.C. power source;
- a first pair of switching elements for applying a positive voltage to said workpiece and said electrode;
- a second pair of switching elements for applying a reverse voltage to said workpiece and said electrode;
- a current limiting resistance for positive voltage and reverse voltage; and
- a plurality of diodes, at least one of said diodes serving as a protection for a corresponding switching element in said first and second pairs of switching elements, said at least one diode being connected in parallel with said corresponding switching element;
- wherein each of said diodes connected in parallel to said switching elements at said lower side of said first and second pairs of switching elements has its cathode arranged such that said first pair of switching elements have their respective diodes connected to said electrode, and said second pair of switching elements have their respective diodes connected to said workpiece.

5. A method of operating a discharge processing machine having a power source assembly for supplying a voltage to an interpole location, said assembly having a power source, a first pair of switching elements and a second pair of switching elements, and protection means for protecting the switching elements, comprising:
- turning said first pair of switching elements ON/OFF simultaneously for a first predetermined period of time to generate a group of pulses of positive voltage;
- tuning said second pair of switching element ON/OFF simultaneously for a second predetermined period of time to generate a group of pulses of reverse voltage; and
- selectively operating said protection means on the basis of frequency of switching operation.

6. The method of operating a discharge processing power source assembly as set forth in claim 5, wherein said protection means is electronically switched.

7. A method of operating a power source assembly for supplying a voltage to an interpole location of a discharge processing machine, said assembly having a power source, a first pair of switching elements and a second pair of switching elements, and protection means for protecting the switching elements comprising a first limiting resistance for said first pair and a second limiting resistance for said second pair, said method comprising:
- turning said first pair of switching elements ON/OFF simultaneously for a first predetermined period of time to generate a group of pulses of positive voltage;
- turning said second pair of switching elements ON/OFF simultaneously for a second predetermined period of time to generate a group of pulses of reverse voltage; and
- selectively bypassing said first limiting resistance for reverse voltage and said second limiting resistance for positive voltage.

* * * * *